Sept. 24, 1940.  M. HARPER  2,215,502
SUBSTANDARD SOUND FILM
Filed June 4, 1938
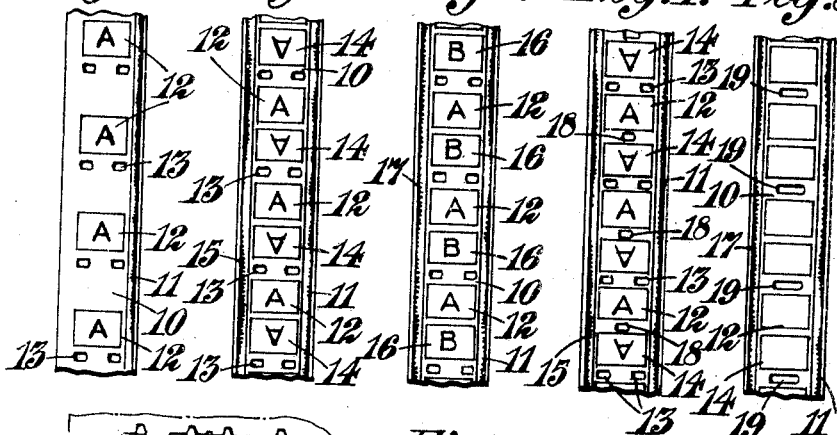
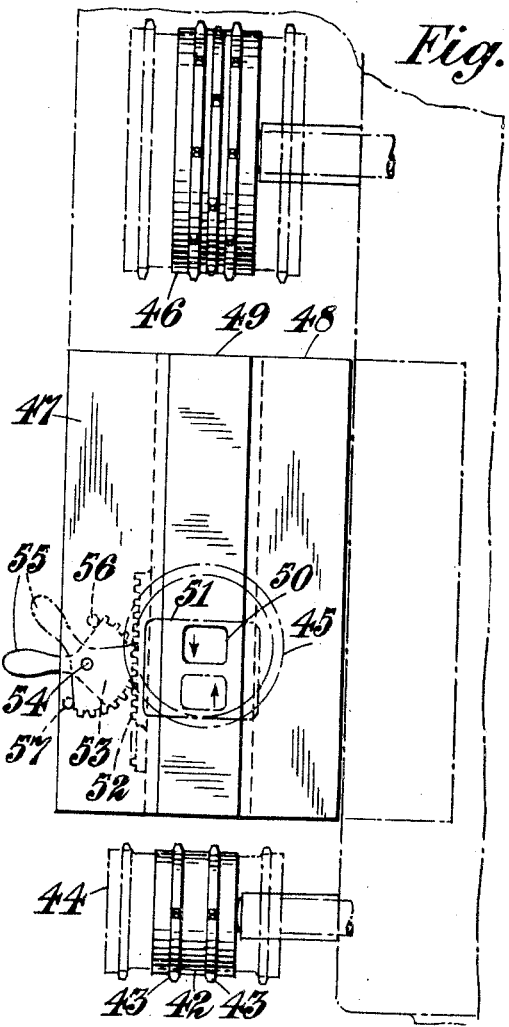
INVENTOR
MARTIN HARPER
By Stebbins, Henbok Parmelee
ATTORNEYS Patented Sept. 24, 1940

2,215,502

UNITED STATES PATENT OFFICE 2,215,502

SUBSTANDARD SOUND FILM

Martin Harper, Hoddesdon, England, assignor to Varley Sound Film System Limited, London, England, a British company Application June 4, 1938, Serial No. 211,866
In Great Britain January 4, 1938

3 Claims. (Cl. 88—16.2)

This invention consists in improvements in substandard sound films.

Film for cinemotographic projection are made in various sizes, which are differentiated by the width of the film stock. The largest size of film such as is generally used in cinema theatres, is 35 mm. in widths and is known as "standard film," while there are other sizes, 17.5 mm., 16 mm., 9.5 mm. and 8 mm. in widths respectively which are widely used for educational purposes and for projection on small machines in schools, private houses and the like. These smaller sizes are grouped under the term "substandard" film. These definitions of the words "standard" and "substandard" are to be understood throughout this specification and claims.

It is well known to produce substandard film by simple optical reduction from a standard negative. In the usual substandard combined picture and sound films, where a sound track is provided along one side of the film, and is reduced both in length and in width, much of the detail contained in the original standard sound track is lost, so that the reproduction is poor particularly as regards the higher frequencies, and the quality of sound inferior to that obtained from a standard sound track.

Prior to the use of sound films, silent pictures of standard size were projected at a speed of 1 foot per second, or sixteen picture frames per second, and this speed provided perfect animation and was satisfactory from a purely visual standpoint, but with the introduction of combined sound and picture films it was found that a speed of eighteen inches or twenty-four frames per second was necessary to obtain satisfactory sound reproduction from the standard sound track. It will be understood, therefore, that the linear velocity of the sound track is an important factor in obtaining efficient reproduction. Substandard films being projected at sixteen or even twenty-four frames per second would naturally have a linear velocity considerably lower than eighteen inches per second, and this tends still further to reduce the quality of the reproduction obtainable.

It is an object of the invention to enable a substandard film to be projected at standard speed so that it is capable of sound reproduction equal to that of a standard sound film.

It is another object of the invention to enable a substandard film to be projected without the need for subsequently rewinding the film.

It is a further object of the invention to enable a substandard film to be inserted in a projector in such a manner that the appropriate picture frame cannot fail to register with the picture-aperture of the projector.

It is yet a further object of the invention to enable a substandard film to be printed without the possibility of "overprinting" occurring.

The invention comprises substandard combined sound and picture film, characterized by a series of pictures the pitch of which from picture to picture is double or approximately double the usual pitch or more, feed perforations in the spaces between the pictures, and a sound track at one side of the pictures which is elongated to correspond with the increased picture spacing.

A feature of the invention is that in addition a second series of pictures is intercalated between the pictures of the first series and a corresponding sound track is provided therefor.

A further feature of the invention is that the second series of pictures may be inverted relatively to the first series to obviate re-winding.

In the drawing—

Figure 1 is a diagrammatic representation of a combined sound and picture film provided with one sound track and one series of pictures;

Figure 2 is a diagrammatic representation of a sound and picture film provided with two sound tracks and two series of pictures;

Figure 3 is a modification of Figure 2;

Figure 4 is a modification of Figure 2 provided with an extra perforation;

Figure 5 is a modification of Figure 2 provided with slotted perforations;

Figure 6 is a front elevation of the aperture in a projector for projecting substandard films.

Referring to the drawing, the film in Figure 1 consists of a length of substandard stock 10 carrying along one edge a sound track 11 and along its middle a series of picture frames 12, and perforations 13 are provided for driving the film. The stock 10 is substandard in that it carries picture frames of substandard dimensions but the sound track 11 is of standard size both as regards its width and its length, and the stock is intended to be run at a speed such as is normally used in the projection of standard films. From this it will be seen that so far as the sound track 11 is concerned, it is in all respect exactly similar to a sound track of standard size.

It is therefore necessary for the stock 10 to move through a camera or projector at standard speed (e. g., eighteen inches per second), and also for a corresponding number of frames, in this instance twenty-four, to pass through the picture gate of the camera or projector. Accordingly, the pitch of the substandard pictures 12 is the same as would be the pitch of a series of standard pictures, and the pitch of the perforations 13 is arranged to be a suitable multiple of standard pitch (in the present instances, four times as great).

If, therefore, a substandard film as shown in Figure 1 is passed at standard speed through a projector the picture gate of which is provided with an aperture of substandard dimensions, ordinary substandard picture projection will be obtained while at the same time the reproduction of the sound from the sound track on the substandard film will be of a quality only associated hitherto with standard films.

While the problem of obtaining first class sound reproduction from substandard films has been solved in this manner it will be apparent that substandard film of the kind shown in Figure 1 will be slightly more than twice the length of ordinary substandard 16 mm. film carrying the same number of pictures, and that there will be a considerable quantity of wasted space on the stock. Figure 2 illustrates a film having all the characteristics of that shown in Figure 1, but also provided with a further series of pictures 14 uniformly spaced to form a continuous series capable of producing animation on projection, and occupying the spaces between the first series of pictures 12 and the perforations 13. In addition, a second sound track 15 complementary to the second series of pictures 14 is disposed along the other edge of the stock.

The second series of pictures 14 is disposed in an inverted position relatively to the first series 12, and it will be realised that on projection, the film may be run from a feeding spool to a take-up spool so that the first series of pictures 12 is shown in proper order, whereupon the take-up spool may be removed from the machine without the necessity for any rewinding and immediately substituted for the feeding spool, so that when the film is again run through the projector, it will be in an inverted position relatively to its previous run, and the second series of pictures 14 will be projected in their correct order and right way up, and will automatically be correctly framed relatively to the picture aperture.

Another way in which film in accordance with the invention may be projected is for the projector to be arranged so that when the film is run through once and is wound upon the take-up spool, the direction of motion of the film is reversed, and it is again pressed through the projector in the opposite direction so that it is fed from the take-up spool and taken up on the feeding spool.

An example of film adapted for this procedure to be carried out is shown in Figure 3. The stock 10 carries a series of pictures 12 disposed similarly to the pictures 12 in Figure 1, and a complementary sound track 11. A further series of pictures 16 are intercalated between the first series as were those shown in Figure 2, but the pictures 16 are not inverted relatively to the pictures 12. In addition, there is a second complementary sound track 17 which again is not inverted relatively to the sound track 11.

When the film has been run through the projector in the usual manner so that the series of pictures 12 and the sound track 11 have been presented, and the film has been fully wound up on the take-up spool, the direction of motion of the projector is reversed and the sound gate is shifted so that in its new position it scans the sound track 17. As the film is fed back through the projector from the take-up spool to the delivery spool, the second series of pictures 16 and their accompanying sound track 17 are presented, and as no inversion has taken place either in the disposition of the second series of pictures on the film or the disposition of the film in the projector, the pictures 17 will be presented right way up. When projecting in this manner, it will also be necessary to shift the aperture of the projector after the film has been run through it for the first time, and this will be described below.

In Figure 4 the series of pictures 12 and 14 and the sound tracks 11 and 15 are disposed for projection in a similar manner to that for the film shown in Figure 2, although the pictures and sound track might equally well be disposed as shown in Figure 1 or 3. The film is however provided with a series of perforations 18 in addition to the perforations 13. The perforations 18 have a pitch four times that of standard films, but they are spaced along the centre of the stock so that the film may be fed through the machine by sprockets each having an extra set of teeth in addition to the usual two already provided for the purpose of relieving the strain on the film.

Figure 5 shows a further modification of a substandard film which may carry one or two sound tracks and one or two series of pictures disposed as shown in any of the preceding figures, and having in addition a series of elongated slots 19, pitched at four times standard pitch. In this way it will be seen that substandard film according to the invention may be fed through machines having different varieties of sprockets, as, for example, a printer of the non-slip type, in which the sprockets of the standard and substandard sides of the printer need not be alike.

The step of exposing substandard film prior to developing for printing purposes can be carried out in a variety of well-known ways to produce a film according to the invention. Dealing first with optical printing, a standard positive may be optically reduced on to substandard stock to produce a negative, from which a substandard positive can subsequently be produced, or a substandard positive may be optically projected on to substandard stock without reduction.

Substandard films according to the invention can also be produced from identical substandard positives or negatives by contact printing with or without chemical reversal of the image. For these methods the only modification necessary to standard machines is the provision of feeding means such as substandard sprockets having a pitch corresponding to that of the perforations on the film, for example, four times standard pitch.

As was stated above, in the projection of film such as is shown in Figure 3, it is necessary, after the film has been run through the projector for the first time, thus projecting the first series of pictures 12, for the direction of motion of the projector to be reversed and for the film to be run the other way back on to the feeding spool. When the end of the film has been reached after the first run through, the last picture of the series 12 is being projected, and if it is desired to project next the first picture of the series 16, it will be necessary to shift the aperture of the projector as this picture is adjacent the last picture of the first series. When the aperture has been shifted to achieve this result, the second series may then be projected without further movement of the aperture, while the first series will be completely masked.

An arrangement for carrying this out is shown in Figure 6, which illustrates a portion of a standard size projector adapted for projecting substandard films in accordance with the invention. No arrangements for the presentation of the sound track are shown in this figure, as it is well known that owing to the intermittent action of the film at the picture gate, the sound gate must be situated at a fixed distance in advance of this, at a point where the film is travelling continuously. A sprocket 42 of substandard width and having two sets of teeth 43 set at a pitch four times as great as standard pitch is disposed below the aperture to feed the film intermittently. When it is desired to construct a reversing projector, any well-known reversible intermittent movement may be used. The sprocket 44 indicated in chain lines shows the ordinary position of a standard sprocket. The film is led up past the lens indicated at 45 on to another sprocket 46. Immediately behind the lens and slightly to the sides thereof are two vertical guides 47 and 48 carrying a plate 49 which can freely slide in a vertical direction in the guides. This plate is provided with a substandard aperture 50. The standard aperture 51 is indicated in chain lines for purposes of comparison. The plate 49 carries a rack 52 disposed vertically along one edge, and meshing with a pinion 53 capable of pivotal movement about a pivot 54 on the guide 47 by means of a handle 55 accessible to the operator. Two stops 56, 57 limit the movement of the pinion, and consequently of the rack, and these stops are so arranged that when the pinion is abutting against one of them, the aperture 50 in the plate 49 is in one of the two positions shown.

The operation of shifting the aperture at the requested time during the projection of the film can be carried out in a variety of other ways both manually and automatically. An example of an automatic method is by means of a trip provided on the projector and operated by the film during its passage through the projector.

The taking of films in accordance with the invention direct on to substandard stock can be easily achieved by adaptation of the apparatus described above for the projector so that it performs a similar function in the camera, and the film may be exposed according to any of the methods set out above with regard to projection. The invention also includes the step of taking silent pictures either on standard or substandard stock in two series of intercalated disposition for the purpose of subsequently adding one or more sound tracks at the sides thereof.

It is well-known that enlargement or reduction (by, say, 5% or 10%) of the dimensions of film can be achieved very simply by optical means and simple modification of the apparatus used in connection therewith will enable such film to be satisfactorily used. As regards the dimensions of the sound tracks and series of pictures and the pitch thereof and of the perforations as described and claimed in this specification, these can approximate in the manner stated above without departing from the scope of the invention.

I claim:

1. A substandard combined picture and sound film comprising two or more series of pictures, the pictures in each series being related to other pictures in the same series, the pictures being set with their shorter dimension parallel with the longitudinal sides of the film, areas of blank film between adjacent pictures, the length of the shorter dimension of the pictures and the length of the blank film areas being such that the distance from center to center of two pictures in the same series is equal to the distance from center to center of two adjacent pictures in standard film, sprocket perforations in alternate blank film areas so that the pitch of the perforations is equal to the picture pitch and a multiple of the pitch of the perforations on standard film, and sound tracks along each edge of the film, said sound tracks having the same dimensions as the sound track on standard film.

2. A substandard combined picture and sound film comprising two series of pictures, the pictures in each series being related to other pictures in the same series, the pictures in both series being set with their shorter dimension parallel with the longitudinal sides of the film, areas of blank film between adjacent pictures, the length of the shorter dimension of the pictures and the length of the blank film areas being such that the distance from center to center of two pictures in the same series is equal to the distance from center to center of two adjacent pictures in standard film, two sprocket perforations in alternate blank film spaces, one on each side of the center line of the film, so that the pitch of the perforations is four times the pitch of the sprocket perforations on a standard film, a sprocket perforation in the central portion of each of the blank film spaces not having the aforesaid perforations in pairs, and a sound track correlated to one of the series of pictures along each edge of the film, said sound tracks having the same dimensions as the sound track on standard film.

3. A 16 mm. combined picture and sound film comprising two series of pictures, the pictures in each series being related to other pictures in the same series, the pictures in both series being set with their shorter dimension parallel with the longitudinal sides of the film, areas of blank film between adjacent pictures, the length of the shorter dimension of the pictures and the length of the blank film areas being such that the distance from center to center of two pictures in the same series is equal to the distance from center to center of two adjacent pictures in 35 mm. film, two sprocket perforations in alternate blank film spaces one on each side of the center line of the film, the perforations being spaced from the edge of the film a distance equal to the distance between the perforations and the inside edge of the sound track of a 35 mm. film, and a sound track correlated to one of the series of pictures along each edge of the film, said sound tracks having the same dimensions as the sound track on a 35 mm. film.

MARTIN HARPER.